Oct. 30, 1951  M. J. BERLYN  2,573,301
VALVE MEANS FOR INTERNAL-COMBUSTION ENGINES
Filed Nov. 23, 1948  8 Sheets-Sheet 1

INVENTOR.
MARTIN J. BERLYN
BY
Raymond A. Paquin
ATTORNEY.

Oct. 30, 1951 M. J. BERLYN 2,573,301
VALVE MEANS FOR INTERNAL-COMBUSTION ENGINES
Filed Nov. 23, 1948 8 Sheets-Sheet 6
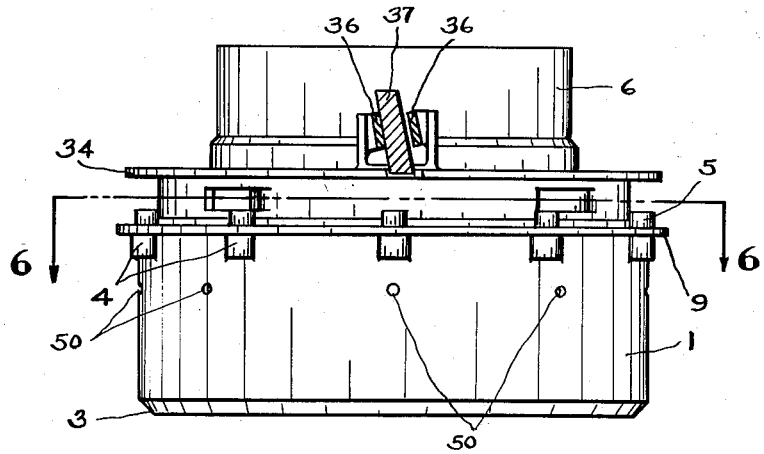
Fig. 5.
Fig. 6.
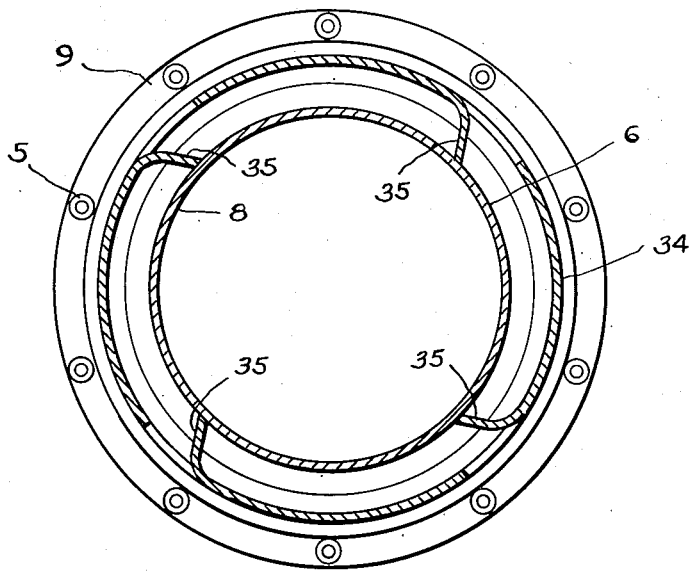
INVENTOR.
MARTIN J. BERLYN
BY
Raymond A. Paquin
ATTORNEY.

Oct. 30, 1951  M. J. BERLYN  2,573,301
VALVE MEANS FOR INTERNAL-COMBUSTION ENGINES
Filed Nov. 23, 1948  8 Sheets-Sheet 7

INVENTOR.
MARTIN J. BERLYN
BY
Raymond A. Paquin
ATTORNEY.

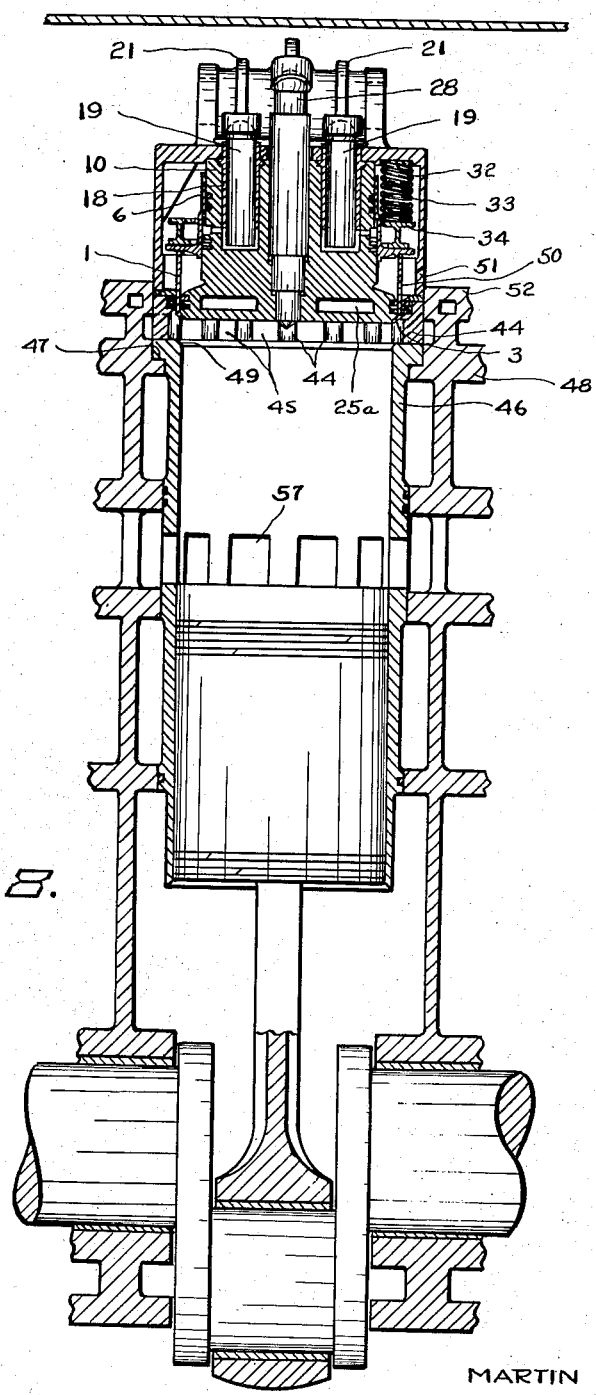

Patented Oct. 30, 1951

2,573,301

UNITED STATES PATENT OFFICE 2,573,301

VALVE MEANS FOR INTERNAL-COMBUSTION ENGINES

Martin J. Berlyn, Enfield, Conn.

Application November 23, 1948, Serial No. 61,671

3 Claims. (Cl. 123—188)

This invention relates to valve means for internal combustion engines and has particular reference to the provision of new and improved inlet and exhaust valve means for high-specific-output internal combustion engines, either spark-ignited or compression-ignited types working on the two stroke cycle.

In its elementary form the two-stroke-cycle engine is provided with inlet and exhaust ports which are covered by the engine piston during compression, combustion and expansion and are uncovered during exhaust, scavenging and charging.

With simple piston-controlled ports the timing of their opening and closing is a poor compromise with the requirements, departing from the ideal to a degree which seriously limits the power output obtainable.

In order to minimize the shortcomings of the elementary ported engine, some have employed additional inlet ports nearer to the cylinder head than the exhaust ports. This arrangement permits admission of air to the cylinder after the exhaust ports have been covered by the piston. With this construction, however, non-return check valves must be provided for each cylinder in order to prevent exhaust gasses from blowing back into the inlet-air manifold as a consequence of the uncovering of these inlet ports by the piston before it uncovers the exhaust ports, pressure in the cylinder before the exhaust ports are uncovered being higher than the pressure in the inlet-air manifold. In this construction, the non-return check valves have been a prolific source of trouble except in the case of very low-speed, low-specific-output engines and they have proven quite impracticable for high-speed, or high-specific-output engines.

Another approach has been the provision of mechanically-operated exhaust valves of the poppet or piston type in the cylinder head. Many successful engines of the high-speed, though medium-specific-output, category, have been of this execution. They have, however, been limited by the fact that the timing of the piston-controlled inlet ports is far from the optimum as the inlet ports open prematurely in the expansion stroke and close too early to permit efficient charging of the cylinder.

Yet another approach has been the provision of a sleeve valve controlling both inlet and exhaust port timing. This method makes possible the achievement of any desired timing of the opening and closing of both inlet and exhaust ports, but no sleeve-valve two-stroke-cycle engine embodying this arrangement has ever been commercially successful for two reasons. First, a sleeve operating at crankshaft speed is subjected to high accelerations, also the sleeve for a two-stroke-cycle engine is necessarily longer and heavier than that for a four-stroke-cycle engine, and balancing and structural difficulties are great. Second and probably the worst handicap of the sleeve-valve application to two-stroke-cycle engines is that it being insinuated into the path of the heat-flow from the cylinder to the cooling system, imposes a low limit on the specific output which may be developed without destructive overheating.

The opposed-piston engine with offset cranks may be proportioned so as to approach the optimum timing and some highly successful engines of this type have been operated at high speeds and high specific output, but this is an expansive and somewhat bulky design whose inherent shape rules it out of many applications.

A valve construction for high-specific output internal combustion engines, either of the spark-ignited or compression-ignition types, working on the two-stroke cycle, must fulfill certain conditions as follows:

The valve openings must be large, the valves must be light in weight so as to permit rapid opening, rapid closing and high speeds of operation without introduction of destructive inertia forces or intolerable unbalances. The valve means must also be such as will permit good cooling of the exhaust valve and of the cylinder head. It is also imperative, in order to obtain high specific output, that good cooling of the fuel injector and/or spark plug be obtained.

The geometry of the valve means must not dictate spacing the cylinder centers any farther apart than called for by considerations of structure, bearings and cylinder cooling. The valve means must not prescribe the fundamental layout of the engine, as is the case of opposed-piston engines.

The total opening angle of both inlet valves and the exhaust valves is asymmetrical with respect to bottom dead center, with the exhaust valve leading and the inlet valve lagging, whereby the overlap is small and inlet valve closing is considerably later than exhaust valve closing.

In addition the valve construction must be relatively simple and economical.

It is the principal object of the present invention to provide new and improved inlet and exhaust valve constructions which are particularly adapted for high specific output internal combustion engines, which overcome the difficulties encountered with prior type valve constructions and possesses the advantages set forth above and which are relatively simple and economical in construction yet efficient in operation.

Other objects and advantages of the invention will be apparent from the following description taken in connection with the accompanying drawings and it will be understood that the valve constructions illustrated and described are by way of example only and that modifications thereof may be resorted to without departing from the field and scope of the invention and I intend to include in this application all such variations as fall within the scope of the appended claims as the preferred forms only of my invention have been disclosed.

Referring to the drawings:

Fig. 5 is a fragmentary view of the exhaust valve and valve-spring seat-ring showing means for oscillating the seat ring;

Fig. 6 is a section, in a plane at right angles to the cylinder axis, of the exhaust valve and valve spring seat ring showing the means of imparting discontinuous rotation to the valve by oscillation of the valve spring seat ring;

Figure 7:
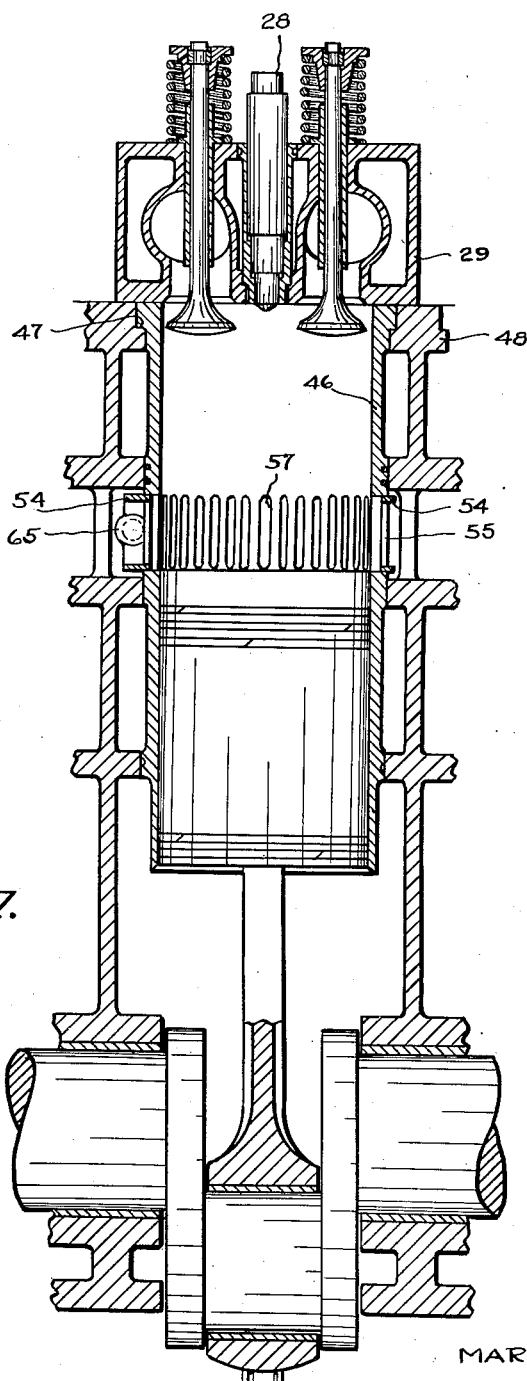

Fig. 7 is a section, in a plane containing the cylinder axes and the crankshaft centerline, of an execution employing the subject inlet valve means in conjunction with conventional poppet type exhaust valves; and Fig. 8 is a section, in a plane containing the cylinder axes and the crankshaft centerline, of an execution employing the subject exhaust valve in conjunction with conventional piston-controlled inlet ports.

In the drawings the invention is shown applied to a compression ignition engine fitted with mechanically operated fuel injector, though the valve construction described is equally applicable to a spark ignited engine or one provided with any other type of fueling means.

Referring more particularly to the drawings wherein similar reference characters designate corresponding parts throughout the several views: In the form of the exhaust valve shown embodying the invention, the exhaust valve 1 consists of a cylindrical cuff having an inwardly turned lip 2 on the outside of which is formed the beveled face 3. At the end of the cuff remote from the beveled face are a number of bosses 4 provided with threaded holes to receive bolts 5 by means of which the valve 1 is attached to valve-actuating guide member 6. Guide member 6 is provided with two coaxial bores 7 and 8 and a flange 9 near the end of the guide having the larger bore 8.

Exhaust valve 1 is slidably mounted on cylinder head 10 and the sliding fit between valve 1 and cylinder head 10 is sealed against gas leakage by piston rings 11. The cylinder head 10 is externally a solid of revolution having essentially three coaxial diameters 12, 13 and 14. Diameter 14, on which valve 1 slides, is larger than diameter 13 on which bore 8 of the guide member 6 is slidably mounted, and diameter 13 is larger than diameter 12 on which bore 7 of the guide member 6 is slidably mounted.

At the junction of cylinder head diameters 12 and 13 an annular groove 15 is formed in the periphery and two holes 16 communicate this groove with two parallel bores 17 which contain sleeves 18 in which are slidably fitted plungers 19 operated by cams 20 through the medium of rocker levers 21. A hole 22 also communicates the groove 15 with the non-return check valve 23 which controls a supply of lubricating oil fed through pipe 24. Piston rings 25 and 26 seal the fits of coaxial bores 7 and 8 of guide member 6 on coaxial diameters 12 and 13 of cylinder head 10 respectively against oil leakage.

Diameter 14 of cylinder head 10 is provided with an annular cooling duct 25a connected with coolant inlet and outlet pipes 26a and 27 respectively.

Cylinder head 10 is provided with coaxial bores for the reception of injector 28 and is attached to cylinder head cover 29 by bolts 30.

Cylinder head cover 29 is held to the cylinder block 48 by bolts 31 and is provided with seats 32 for the multiple valve springs 33, the other ends of which abut against the seat ring 34 which, in turn, abuts against the flange 9 of valve actuating guide member 6. Seat ring 34 is provided with spring fingers 35 which are adapted to press against the outer surface of guide member 6 at such an angle to the tangent at the point of contact that relative rotation of seat ring and guide member produces more frictional drag in one direction than in the other. Seat ring 34 is also provided with two lugs 36 adapted to engage guide block 37 which is attached to cylinder head cover 29 by bolts 38. Guide block 37 is set with its axis at an oblique angle to the axis of exhaust valve 1.

The lower lip of cylinder head cover 29, which is provided with a slightly constricted bore 39 at this end, abuts against beveled ring 40 which retains sealing rings 41 and spacer ring 42. Ring 40 in turn abuts against stay ring 43 which is provided with multiple bosses 44 spanning the exhaust ports 45 and pressing the cylinder liner 46 against seat 47 in cylinder block 48. Cylinder liner 46 is provided at its upper end with an internally beveled seat 49 adapted to make a sealing fit with the beveled face 3 of exhaust valve 1.

Exhaust valve 1 is provided with multiple holes 50 radially through the wall and so located that, in normal functioning, these holes do not cross the piston rings 11 or the sealing rings 41.

Cylinder head cover 29 is provided with multiple oblique holes 51 so located that their outer ends are clear of the surface 52 of the cylinder block 48 while the inner ends penetrate into the constricted bore 39 of cylinder head cover 29 close to the abutment against ring 40.

The functioning of the exhaust valve is as follows: during the compression, combustion and expansion phases of the cycle the valve 1 is held by springs 33, through the medium of seat ring 34 and flange 9, with beveled face 3 in contact with beveled seat 49 of cylinder liner 46. The bore of valve 1 is of greater diameter than the sealing fit of beveled face 3 against the beveled seat 49, due to the inwardly turned lip 2, and gas pressure in the cylinder, therefore, tends to cooperate with springs 33 in maintaining the valve in closed position.

Since the valve bore is sealed against gas leakage by piston rings 11, the fit of the valve bore on diameter 14 of cylinder head 10 may be sufficiently loose to permit the valve 1 free self-centering action in seat 49.

When the lobes of cams 20 tilt rocker levers 21, the plungers 19 are forced down and raise the pressure of the lubricating oil with which the plunger bores, ducts, annular groove and valve guide clearances are filled. The oil pressure acts on the differential area of bores 7 and 8 of guide member 6 and the valve 1 is lifted off seat 49 when the force due to oil pressure on the differential area of the guide member exceeds the bias of pressure due to springs 33 and cylinder gas pressure acting on the differential area of the bore of valve 1 and the effective sealing diameter where face 3 contacts seat 49. In order to maintain the system full of lubricating oil, and to make up for seepage past piston rings 25 and 26 and past plungers 19, a pipe 24 leads oil by way of a non-return check valve 23 and hole 22 to the annular groove 15 in cylinder head 10. When valve 1 is lifted off seat 49, the pressure of the oil in the valve-lifting system is greater than the pressure in the engine lubricating oil system and check valve 23 is held shut, but when the valve 1 is seated on seat 49, the oil pressure in the valve-lifting system may be less than the pressure in the engine lubricating system in which case check valve 23 is forced open and make-up oil enters the valve lifting system as required.

Outer sealing rings 41 are provided for the prevention of blowby of exhaust gas into the inside of the cylinder head cover and for the prevention of seepage of lubricating oil into the exhaust ports 45.

Lubrication of valve 1 is effected by oil which seeps past piston rings 25 and 26, but this amount of oil would be excessive and would lead to smoke in the engine exhaust and formation of carbon deposits on the valve, but control of the amount of lubricating oil available to the valve 1 is achieved by utilization of the action of flange 9 of guide member 6 as an air displacer piston; when the valve 1 is fully lifted, flange 9 is clear of the constricted bore 39 and the space below flange 9 is filled with air at atmospheric pressure. As the valve descends, flange 9 enters bore 39 and air is compressed both inside and outside of valve 1. Air escapes from the inside of the valve to the outside by passing at high velocity through holes 50 and air escapes from the space surrounding the outside of valve 1 by passing at high velocity through ducts 51, this rush of high-speed air carries excess oil from the inside of the cylinder head cover and deposits it on the upper surface 52 of cylinder block 48 whence it drains back to the engine sump in the conventional manner.

The contours of the beveled edge of diameter 14 of cylinder head 10 and the beveled edge of ring 40 are so positioned in relation to holes 50 and 51 as to lead excess oil into the path of the high-speed air streams.

It is well known that rotation of bevel seated exhaust valves gives them greatly improved service life and the subject valve is endowed with discontinuous rotation, only rotating when unseated, in the following manner: Two lugs 36 on valve spring seat ring 34 engage the obliquely mounted stationary guide block 37 so that reciprocation of seat ring 34 along its axis is translated into oscillation of small amplitude about its axis. The spring fingers 35 of seat ring 34 are adapted to transmit torque from seat ring 34 to valve guide member 6 when relative rotation of the two is in one direction but not in the other; oscillation of seat ring 34 therefore imparts intermittent unidirectional torque pulses to valve 1. Lugs 36 are spaced apart somewhat more widely than the thickness of guide block 37 so as to produce some lash or lost motion; the object of this is to avoid transmission of torque to the valve until after it has been unseated. The spring fingers 35 are so oriented in relation to the obliquity of the guide block 37 as to promote rotation of the valve 1 while it is rising; forced rotation of the valve while moving toward its seat could cause wear and scuffing and is therefore avoided.

This valve design provides an extremely large opening area with small valve movement. The valve and associated moving parts are light in weight. A minimum area of the valve is exposed to heat, particularly when the valve is open and high gas velocity past the valve is favorable to transfer of heat to the valve; whereas, with the conventional poppet valve, the maximum area is exposed to flame under maximum velocity conditions this cuff valve enjoys minimum exposure at maximum velocity.

All parts of the valve which are exposed to heat are very close to the cooled cylinder head and the heat flow-path is very much shorter than with poppet valves.

This cuff valve is suitable for use in cylinders employing very high combustion pressures because it only moves when cylinder pressures are low, unlike the sleeve valve which is moving while subjected internally to the maximum combustion pressure. Because this cuff valve is static during periods of high cylinder pressure, small transient increase of diameter is not objectionable, and this allows the wall of the cuff valve to be made lighter than that of the sleeve valve.

With large poppet exhaust valves in high output engines the cam gear has to force the valves open against the considerable closing bias produced by internal cylinder pressure acting on the whole valve area. This cuff valve, on the other hand, may be so proportioned that the differential area producing a closing bias due to gas pressure in the cylinder is, though positive, very small in relation to the valve opening area; this is favorable to reliability and low first cost of the valve-actuating mechanism.

Figure 1:
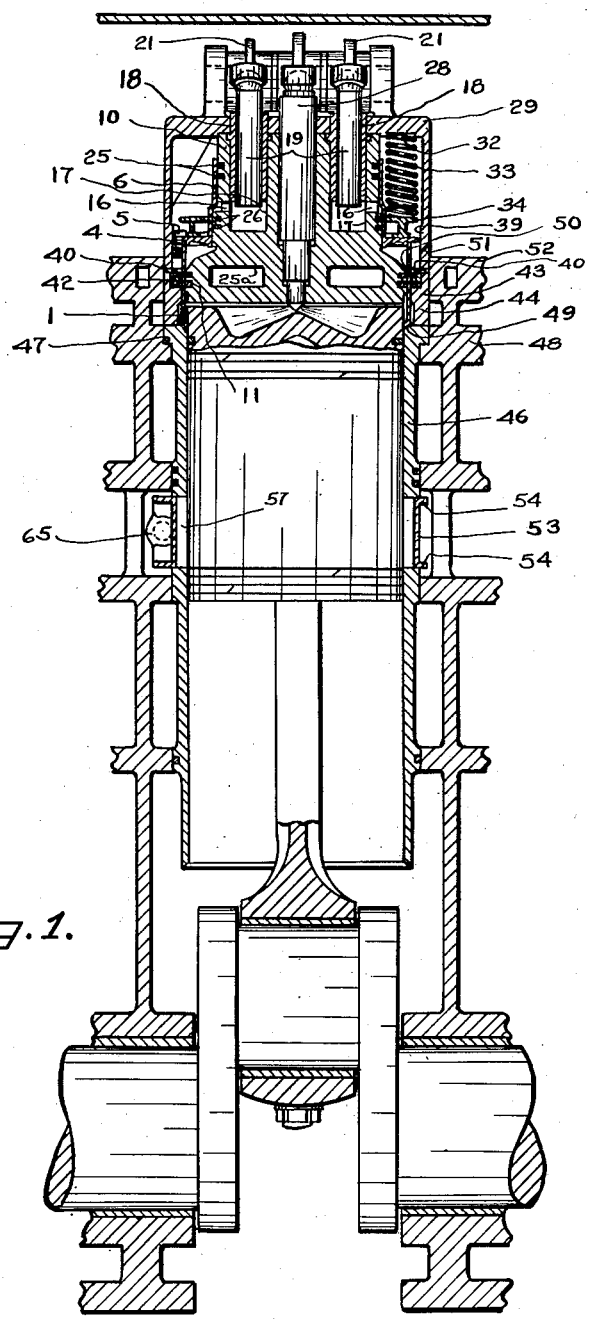
Fig. 1 is a section of a cylinder of a multicylinder execution of the engine, the section being in the plane containing the centerline of the crankshaft and the axes of the cylinders.
Figure 2:
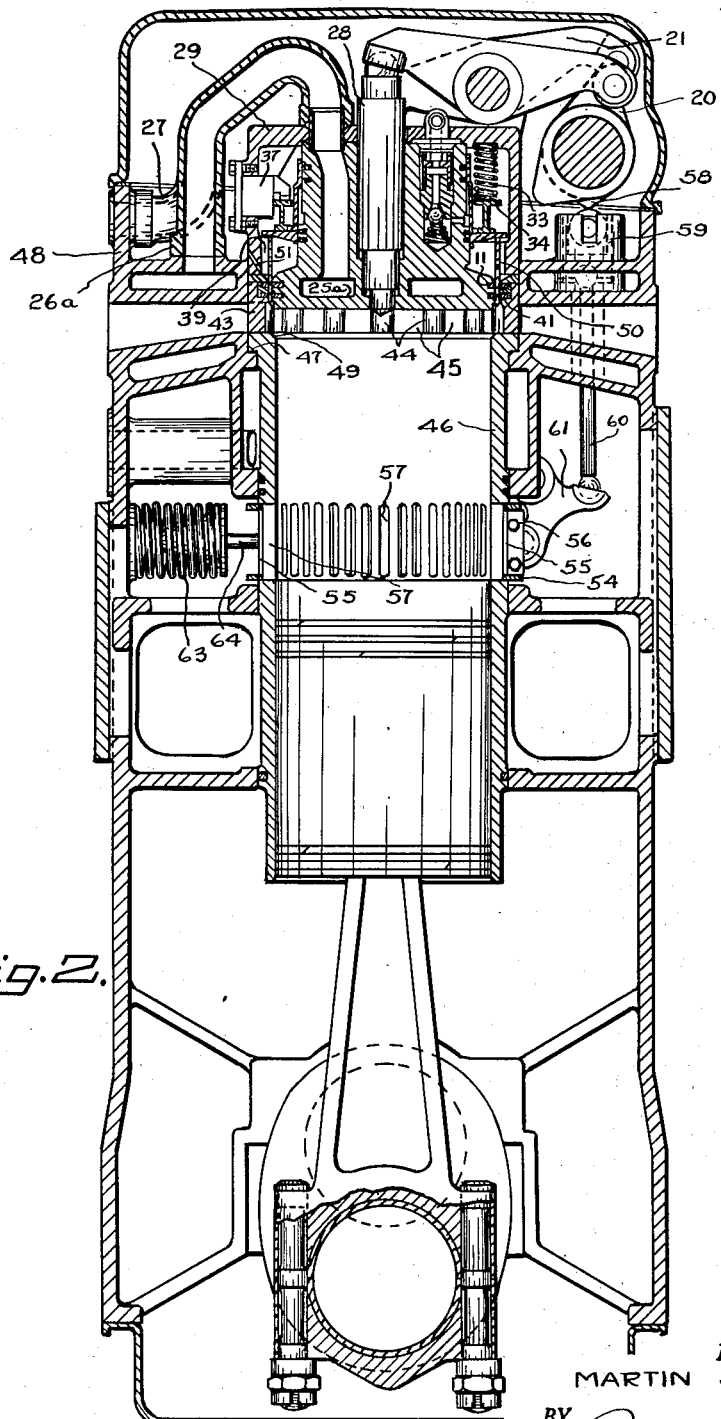
Fig. 2 is a section, similar to Fig. 1, but in a plane at right angles to the crankshaft centerline and containing the axis of one cylinder.
Figure 2A:
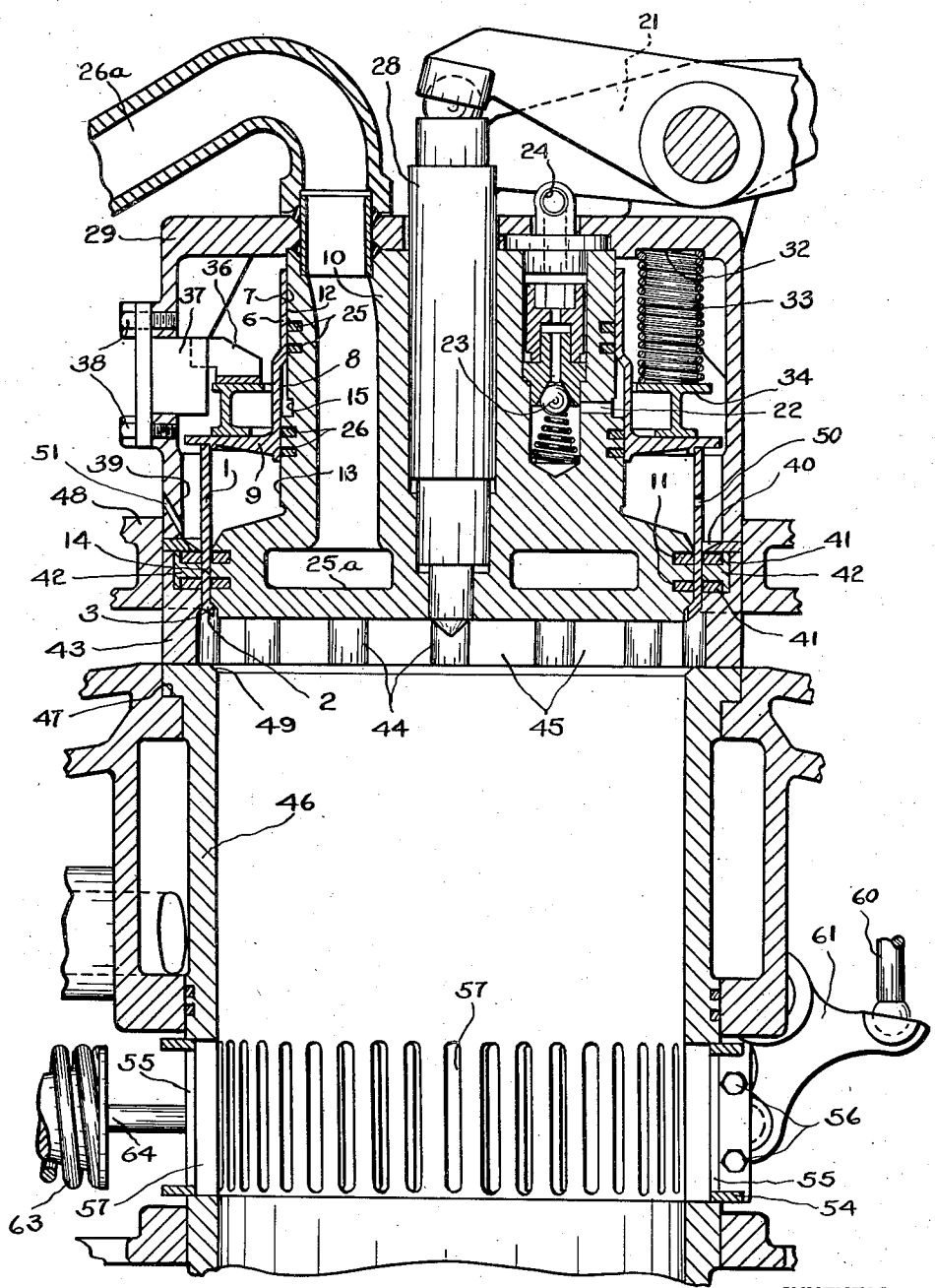
Fig. 2A is a fragmentary view of the construction shown in Fig. 2 but on an enlarged scale.
Figure 3:
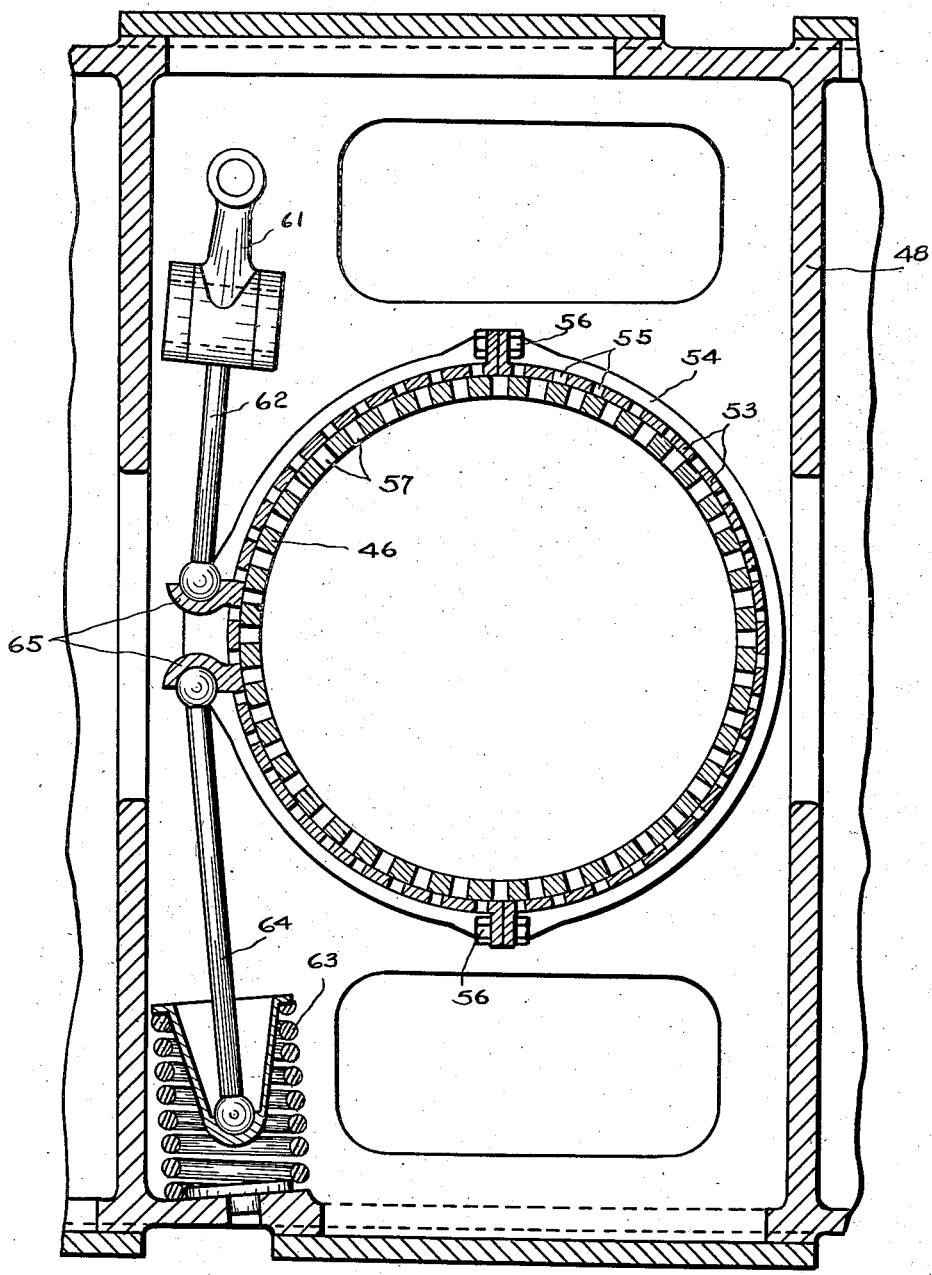
Fig. 3 is a section through the inlet valve in a plane at right angles to the cylinder axis and parallel with the crankshaft centerline.
Figure 4:
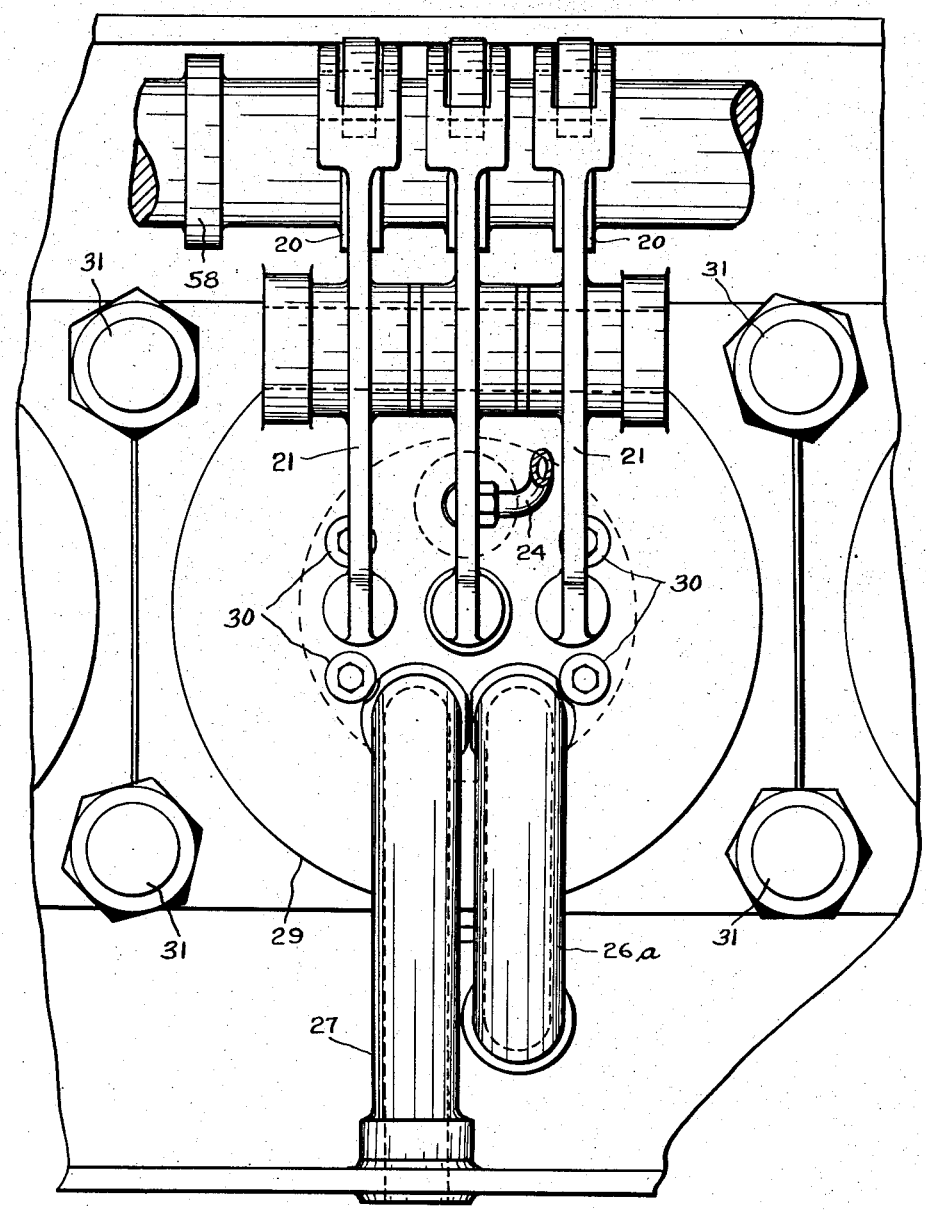
Fig. 4 is a plan view of one cylinder of a multicylinder execution.

The inlet valve consists of a cylindrical cuff 53 provided with stiffening flanges 54 and multiple ports 55. The valve is preferably made in two halves with the joint on a diameter. The halves are held together by bolts 56 and the bore of the assembled valve 53 is a free running fit on the outside of the cylinder liner 46 which is provided with multiple ports 57 coinciding in shape, size and spacing with ports 55 of the valve 53. The ports are uniform in size, shape and spacing and are proportioned so that, in both liner 46 and valve 53, the width of the port openings is less than half the circular pitch of the ports. The ports may be parallel with the cylinder axis, as shown in Fig. 2, or they may be helically arranged at an oblique angle to the cylinder axis; the port openings may be radial to the cylinder axis or they may be formed on an angle to the radius in order to promote swirl of the ingoing charge. The valve is actuated by means of cam 58 in cooperation with tappet 59 through pushrod 60, bell-crank lever 61 and pushrod 62; opposing cam action is spring 63 which transmits torque to valve 53 through pushrod 64. Valve 53 is provided with two lugs 65 into which are socketed the ball-ended pushrods 62 and 64.

If desired, other means such as hydraulically operated means may be employed for operating valve 53.

The functioning of the inlet valve is as follows: The height of the ports 57 in cylinder liner 46 is such that the descending piston uncovers them considerably earlier in the expansion stroke than the point at which it is efficient to open them; at the point where the piston begins to uncover ports 57, and for some further downward piston stroke, the valve 53 is so positioned by its actuating cam gear that valve ports 55 do not register with cylinder ports 57; it is therefore possible to sustain in the cylinder gas pressures appreciably higher than that in the air supply manifold and no blowback into the air supply will take place. After the exhaust valve 1 has opened (which takes place later in the downward piston stroke than the uncovering of ports 57 by the piston) and when the pressure inside the cylinder has, due to "blowdown," fallen to a lower value than that of the supply air, the actuating cam gear of inlet valve 53 imparts rotation to 53 so as to bring ports 55 of valve 53 into register with ports 57 of cylinder liner 46.

Shortly after this (in terms of crank rotation) the exhaust valve 1 closes. The cylinder continues to be charged through ports 55 and 57 until the rising piston shuts off ports 57, after which the actuating cam gear of valve 53 begins to impart rotation so as to carry ports 55 out of register with ports 57.

Since the valve 53 is of very light construction and because the amplitude of oscillation required to achieve the cycle from "fully open" to "fully closed" is small, and because there is no need to close the valve quickly, it is suitable for very high speed operation.

Owing to the unusually large dimension of the ports in the direction parallel with the cylinder axis and because the inlet ports may aggregate, in the sum of their tangential dimensions, nearly half the perimeter of the cylinder wall, the opening area is large.

In Fig. 7 there is shown an execution wherein the inlet valve means of this invention is employed in conjunction with conventional poppet type exhaust valves and in Fig. 8 there is shown an execution wherein the exhaust valve means of this invention is employed in conjunction with conventional piston controlled inlet ports. In these arrangements the conventional exhaust valve and inlet valve means respectively have not been described as they are of conventional construction and will be apparent to those familiar with the art and therefore in each case only the inlet valve and exhaust valve, respectively, which are constructed according to this invention as previously described, have had reference characters applied thereto which correspond with the description of the present invention as hereinabove set forth.

From the foregoing it will be seen that I have provided relatively simple, efficient and economical means for obtaining all of the objects and advantages of the invention.

Having described my invention, I claim:

1. A valve for an internal combustion engine having a light weight, thin walled cylindrical cuff, a guiding bore for said cuff, a cylinder having a sealing seat adapted to be engaged by said cuff when said cuff is in closed position, means for securing positive actuation of said cuff, said cuff being mounted for rotation and reciprocation and means for effecting rotation during the reciprocation of said cuff, said cuff having an inwardly turned lip with a seating face adapted to engage said seat on said cylinder to close said cuff, the diameter of said sealing seat being less than the diameter of the guiding bore of said cuff whereby the pressure bias urges said cuff towards closed position.

2. A valve for an internal combustion engine having a light weight, thin walled cylindrical cuff, a guiding bore for said cuff, a cylinder having a sealing seat adapted to be engaged by said cuff when said cuff is in closed position, means for securing positive actuation of said cuff, said cuff being mounted for rotation and reciprocation and means for effecting rotation during the reciprocation of said cuff, said cuff having an inwardly turned lip with a seating face adapted to engage said seat on said cylinder to close said cuff, the diameter of said sealing seat being less than the diameter of the guiding bore of said cuff whereby the pressure bias urges said cuff towards closed position, said actuating means comprising hydraulic means for actuating said cuff in one direction and spring means for effecting its actuation in the opposite direction.

3. A valve for an internal combustion engine having a light weight, thin walled cylindrical cuff, a guiding bore for said cuff, a cylinder having a sealing seat adapted to be engaged by said cuff when said cuff is in closed position, means for securing positive actuation of said cuff, said cuff being mounted for rotation and reciprocation and means for effecting rotation during the reciprocation of said cuff, said cuff having an inwardly turned lip with a seating face adapted to engage said seat on said cylinder to close said cuff, the diameter of said sealing seat being less than the diameter of the guiding bore of said cuff whereby the pressure bias urges said cuff towards closed position, said actuating means comprising hydraulic means for opening said cuff and spring means for closing said cuff, said spring means being supplemented by gas pressure for maintaining said cuff in closed position.

MARTIN J. BERLYN.

REFERENCES CITED

The following references are of record in the file of this patent:

UNITED STATES PATENTS

| Number | Name | Date |
| --- | --- | --- |
| 1,081,689 | Morris | Dec. 16, 1913 |
| 1,121,131 | Redrup | Dec. 15, 1914 |
| 1,174,624 | Seitz | Mar. 7, 1916 |
| 1,280,216 | Harris | Oct. 1, 1918 |
| 1,377,798 | Berckenhoff | May 10, 1921 |
| 1,617,710 | Grubert | Feb. 15, 1927 |
| 2,403,865 | Lebet | July 9, 1946 |